United States Patent
Chan et al.

(10) Patent No.: US 8,878,780 B2
(45) Date of Patent: Nov. 4, 2014

(54) DISPLAY APPARATUS

(75) Inventors: Yi-Jen Chan, Taoyuan County (TW);
Golden Tiao, Hsinchu County (TW);
Chang-Ying Chen, Kaohsiung (TW);
Chy-Lin Wang, Taipei (TW);
Kun-Lung Tseng, New Taipei (TW);
Shang-Yi Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 330 days.

(21) Appl. No.: 13/480,461

(22) Filed: May 24, 2012

(65) Prior Publication Data

US 2013/0009862 A1 Jan. 10, 2013

Related U.S. Application Data

(60) Provisional application No. 61/506,155, filed on Jul. 10, 2011.

(30) Foreign Application Priority Data

Dec. 29, 2011 (TW) .............................. 100149642 A

(51) Int. Cl.
| | |
|---|---|
| G09G 5/00 | (2006.01) |
| H04N 13/04 | (2006.01) |
| G03B 35/16 | (2006.01) |
| G03B 35/26 | (2006.01) |
| G02B 27/00 | (2006.01) |
| G02B 27/22 | (2006.01) |

(52) U.S. Cl.
CPC ........ G02B 27/0093 (2013.01); H04N 13/0443 (2013.01); H04N 13/0475 (2013.01); G03B 35/16 (2013.01); G03B 35/26 (2013.01); H04N 13/04 (2013.01); G02B 27/2292 (2013.01)
USPC ................... 345/156; 345/7; 345/8; 359/458; 359/462

(58) Field of Classification Search
USPC ............ 345/7, 8, 156, 173–184; 359/40, 458, 359/462, 472, 561; 178/18.01–18.09, 178/19.01–19.04, 20.01
See application file for complete search history.

(56) References Cited

U.S. PATENT DOCUMENTS

| | | | |
|---|---|---|---|
| 4,671,625 A | 6/1987 | Noble | |
| 4,782,547 A | 11/1988 | Mohnach | |

(Continued)

FOREIGN PATENT DOCUMENTS

| | | |
|---|---|---|
| CN | 1305619 | 7/2001 |
| CN | 1619357 | 5/2005 |

(Continued)

OTHER PUBLICATIONS

Koschan et al., "Dense depth maps by active color illumination and image pyramids", Advances in Computer Vision, 1997, p. 137-148.

(Continued)

*Primary Examiner* — Srilakshmi K Kumar
*Assistant Examiner* — Insa Sadio
(74) *Attorney, Agent, or Firm* — Jianq Chyun IP Office

(57) ABSTRACT

A display apparatus including an image generator, a projection lens set, a depth detecting module detecting the position of user, and a control unit is provided, wherein the control unit is electrically connected to the image generator, the projection lens set and the depth detecting module. An image displayed by the image generator is projected through the projection lens set and generates a floating real image between the projection lens set and the user. Each beam forming the floating real image has a light-cone angle θ. The image generator and the projection lens adjust the position of the floating real image according to the position of user. The size of the floating real image is L, the distance between two eyes of the user is W, the distance between the user and the floating real image is D, and the light-cone angle θ satisfies the formula of $$\theta \geq \tan^{-1}\left(\frac{L+W}{D}\right).$$

23 Claims, 12 Drawing Sheets

(56) References Cited

U.S. PATENT DOCUMENTS

| | | | |
|---|---|---|---|
| 5,782,547 | A | 7/1998 | Machtig et al. |
| 5,917,460 | A * | 6/1999 | Kodama .................. 345/8 |
| 6,014,164 | A | 1/2000 | Woodgate et al. |
| 6,042,235 | A | 3/2000 | Machtig et al. |
| 6,375,326 | B2 | 4/2002 | Myers |
| 6,612,701 | B2 | 9/2003 | Westort et al. |
| 6,808,268 | B2 | 10/2004 | Vrachan et al. |
| 6,809,891 | B1 | 10/2004 | Kerr et al. |
| 7,562,983 | B2 | 7/2009 | Kim et al. |
| 7,760,229 | B2 | 7/2010 | White |
| 2003/0035085 | A1 | 2/2003 | Westort et al. |
| 2009/0309842 | A1 | 12/2009 | Hung et al. |
| 2011/0175797 | A1 | 7/2011 | Tomisawa et al. |

FOREIGN PATENT DOCUMENTS

| | | |
|---|---|---|
| CN | 101750748 | 6/2010 |
| CN | 101872073 | 10/2010 |
| CN | 101995943 | 3/2011 |
| TW | 472170 | 1/2002 |
| TW | 200526980 | 8/2005 |
| TW | 200839297 | 10/2008 |
| TW | 201015116 | 4/2010 |
| TW | M403664 | 5/2011 |

OTHER PUBLICATIONS

Scharstein et al., "High-Accuracy Stereo Depth Maps Using Structured Light", Proceedings of the 2003 IEEE Computer Society Conference on Computer Vision and Pattern Recognition, 2003, p.195-p.202.

Yang et al., "Multi-Resolution Real-Time Stereo on Commodity Graphics Hardware", Proceedings of the 2003 IEEE Computer Society Conference on Computer Vision and Pattern Recognition, 2003, p. 211-p.218.

Min et al., "Three-dimensional electro-floating display system using an integral imaging method", Optics Express, vol. 13, No. 12, 2005, p.4358-p.4369.

"Office Action of Taiwan Counterpart Application", issued on Feb. 12, 2014, p1-p8, in which the listed references were cited.

"Office Action of China Counterpart Application", issued on Sep. 2, 2014, pp. 1-11.

* cited by examiner

DISPLAY APPARATUS

CROSS-REFERENCE TO RELATED APPLICATION

This application claims the priority benefits of U.S. provisional application Ser. No. 61/506,155, filed on Jul. 10, 2011. In addition, this application claims the priority benefit of Taiwan application serial no. 100149642, filed on Dec. 29, 2012. The entirety of each of the above-mentioned patent applications is hereby incorporated by reference herein and made a part of this specification.

BACKGROUND

1. Technical Field

The technical field relates to a display apparatus, and more particularly to a display apparatus having a floating real image.

2. Related Art

In recent years, the continuous advancement of display technologies have resulted in the increasing demands on display quality of displays, such as image resolution, color saturation, and so on. Besides the trend towards high image resolution and color saturation, displays capable of displaying stereoscopic images have been developed to satisfy the user's desire for viewing realistic images.

Conventional stereoscopic displays are limited by the software and hardware restrictions of the planar display or projection techniques adopted, in which a user is required to wear a special pair of stereoscopic glasses when viewing the stereoscopic images. Even with auto-stereoscopic techniques, a severe crosstalk issue exists which causes bodily discomfort for the viewer when viewing the stereoscopic images with crosstalk. Therefore, manufacturers are looking forward to a stereoscopic display which provides a comfortable viewing experience for the user.

Moreover, in many touch control interfaces that are currently available, the corresponding messages and feedback actions are received by using fingers to touch the touch control panels. However, this operating mode is conducive to germ contamination since the touch control interfaces have been touched for extended periods of time. In order to prevent germs from contaminating the user, manufacturers are looking forward to a touch control virtual interface with floating images in space which enables user interaction. Therefore, manufacturers are earnestly striving to overcome the restriction of distance variation between the user and the stereoscopic display.

SUMMARY

The disclosure provides a display apparatus capable of generating a floating real image and adjusting the position and size of the floating real image according to the user position.

The disclosure provides a display apparatus suitable for viewing by a user. The display apparatus includes at least an image generator, a projection lens set, a depth detecting module, and a control unit. The image generator displays at least an image. The projection lens set is located between the image generator and the user, and the image projected by the projection lens set generates a floating real image between the projection lens set and the user. Each beam forming the floating real image has a light-cone angle θ, each beam has a chief ray and a plurality of marginal rays, each marginal ray and the corresponding chief ray has an included angle α, and the light-cone angle θ=2α. Moreover, the control unit is electrically connected to the image generator, the projection lens set, and the depth detecting module. The depth detecting module detects the position of the user, and the image generator and the projection lens set adjusts the position of the floating real image according to the position of the user. The size of the floating real image is L, the distance between two eyes of the user is W, the distance between the user and the floating real image is D, and the light-cone angle θ satisfies a formula:

$$\theta \geq \tan^{-1}\left(\frac{L+W}{D}\right).$$

In summary, by the emitted beam from the projection lens set satisfying a specific relationship, the display apparatus in the disclosure can generate a floating real image between the projection lens set and the user. Moreover, by using the depth detecting module to detect the user position, and the control unit electrically connected to the image generator, the projection lens set, and the depth detecting module, the image generator and the projection lens set can adjust the position of the floating real image according to the user position. In some embodiments, the floating real image is an auto-stereoscopic image, or a stereoscopic floating real image viewable by a pair of stereoscopic glasses. Accordingly, the display apparatus in the disclosure can provide the user a realistic interactive experience that is true to life.

Several exemplary embodiments accompanied with figures are described in detail below to further describe the disclosure in details.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1:
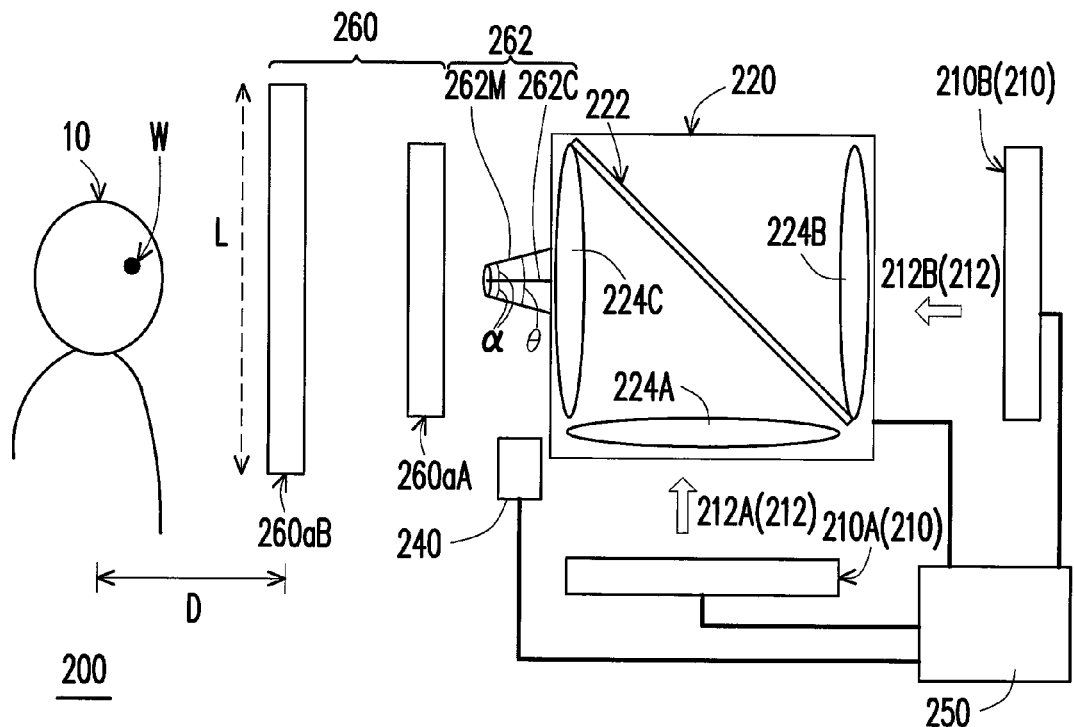
FIG. 1 is a schematic view illustrating a display apparatus according to an embodiment of the disclosure.

FIG. 1 is a schematic view illustrating a display apparatus according to an embodiment of the disclosure. Referring to FIG. 1, a display apparatus 200 is suitable for viewing by a user 10. The display apparatus 200 includes at least an image generator 210, a projection lens set 220, a depth detecting module 240, and a control unit 250. The image generator 210 displays at least an image 212, for example a first image generator 210A displays an first image 212A, and a second image generator 210B displays an second image 212B. The image generator 210 is, for example, a display panel, a light emitting device, or an object being illuminated by light. The projection lens set 220 is located between the image generator 210 and the user 10. The image 212 projected by the projection lens set 220 generates a floating real image 260 between the projection lens set 220 and the user 10.

Moreover, the control unit 250 is electrically connected to the image generator 210, the projection lens set 220, and the depth detecting module 240. The depth detecting module 240 detects the position of the user 10, and the image generator 210 and the projection lens set 220 may adjust the position of the floating real image 260 according to the position of the user 10. Specifically, each beam 262 forming the floating real image 260 has a light-cone angle θ, in which each beam 262 has a chief ray 262C and a plurality of marginal rays 262M, each marginal ray 262M and the corresponding chief ray 262C has an included angle α, and the light-cone angle θ=2α. In particular, the size (i.e. maximum size) of the floating real image 260 is L, the distance between two eyes of the user 10 is W, the distance between the user 10 and the floating real image 260 is D, and the light-cone angle θ satisfies a following formula:

$$\theta \geq \tan^{-1}\left(\frac{L+W}{D}\right)$$

Since each beam 262 forming the floating real image 260 has the light-cone angle θ satisfying the above formula, therefore, after the image 212 displayed by the image generator 210 is transmitted through the projection lens set 220, the user 10 can view a floating real image 260. For example, when the image generator 210 is an apple illuminated by light, by adjusting the light-cone angle θ of the beam 262 projected after passing through the projection lens set 220 to satisfy a following formula:

$$\theta \geq \tan^{-1}\left(\frac{L+W}{D}\right),$$

the user 10 can view a floating real image 260 of the apple between the projection lens set 220 and the user 10. It should be noted that, when the beam 262 projected from the projection lens set 220 satisfies the above formula, a viewing angle of the floating real image 260 viewed by the user 10 is no longer restricted within a specific small range. That is to say, the floating real image 260 can be viewed at a large viewing angle. The large viewing angle referred to herein means that, even if the user 10 moves left or right by 11 cm, the user 10 can still view the entire undistorted floating real image 260. In other words, the display apparatus 200 of the present embodiment can provide floating real images at a viewing angle of 34 degrees (+/−17 degrees) for the user 10.

Moreover, as shown in FIG. 1, the projection lens set 220 of the present embodiment includes a beam combiner 222, a first lens set 224A, a second lens set 224B, and a third lens set 224C. The first image 212A displayed by the first image generator 210A is transmitted through the projection lens set 220 and generates a first floating real image 260aA, and the second image 212B displayed by the second image generator 210B is transmitted through the projection lens set 220 and generates a second floating real image 260aB. The first floating real image 260aA and the second floating real image 260aB of the present embodiment are located on different planes, for example, and a stereoscopic imaging effect can be directly generated. As to other embodiments of the projection lens set 220 and the generation of the stereoscopic imaging effect, further elaboration thereof is provided later in the disclosure.

It should be noted that, by utilizing the control unit 250 and the depth detecting module 240, the display apparatus 200 in the disclosure can provide user-friendly operation and realistic interaction for the user 10. Specifically, the control unit 250 controls the movement of the image generator 210 according to the position of the user 10 detected by the depth detecting module 240, so as to adjust the relative positions of the image generator 210 and the projection lens set 220, the position of the floating real image 260, and the size of the floating real image 260.

The depth detecting module 240 detects the position of the user 10, and the depth detecting module 240 may detect the position of the body of the user 10, or the position of the fingers of the user 10 touching the floating real image 260. Regarding the implementation of the depth detecting module 240, reference may be directed to the co-pending U.S. Patent Application No. 61475648, Apparatus and Method for Depth Image Capturing, and the related mechanisms are described later in the disclosure. In brief, the depth detecting module 240 feeds the detected position information of the user 10 back to the control unit 250. After the control unit 250 performs simple operations, the control unit 250 can calculate the position of the user 10, the position of the floating real image 260, and the required size of the floating real image 260. Accordingly, the image generator 210 and/or the projection lens set 220 are shifted by corresponding distances to achieve the needed image variation effects.

Description of an embodiment of the projection lens set in the display apparatus of the disclosure is provided hereafter, with other elements omitted.

Figure 2:
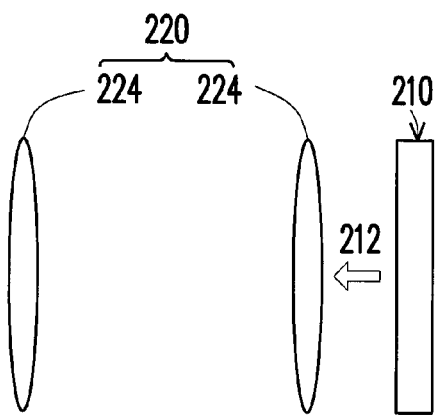
FIG. 2 is a schematic view illustrating a projection lens set in a display apparatus according to an embodiment of the disclosure.
Figure 3:
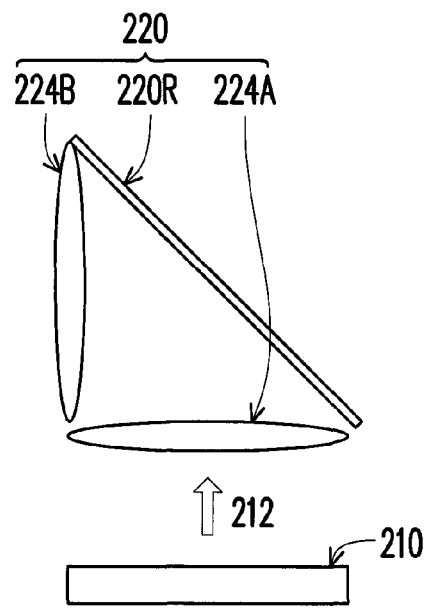
FIG. 3 is a schematic view illustrating a projection lens set in a display apparatus according to an embodiment of the disclosure.

FIGS. 2 and 3 are schematic views illustrating a projection lens set and an image generator in a display apparatus according to an embodiment of the disclosure. In FIGS. 2 and 3, a quantity of the image generator 210 is one, and the image generator 210 has a single light path design. Referring to FIG. 2, the projection lens set 220 of the present embodiment includes two lens sets 224 located on a projection path of the image 212. Each of the lens sets 224 is formed by at least one lens, and the lens may be an aspherical lens, a spherical lens, or a Fresnel lens. Moreover, a total focal length of each of the lens sets 224 is a positive value. In other words, referring to FIGS. 1 and 2, the control unit 250 of the present embodiment controls the relative positions of the two lens sets 224 in the projection lens set 220 relative to the image generator 210 according to the position information of the user 10 detected by the depth detecting module 240, so as to adjust the position and the size of the floating real image 260.

On the other hand, referring to FIGS. 1 and 3, the projection lens set 220 of the present embodiment includes a reflector 220R, a first lens set 224A, and a second lens set 224B, in which the reflector 220R is a total reflector mirror, for example. The reflector 220R is located on the projection path of the image 212. The first lens set 224A is located on the projection path of the image 212 and located between the image generator 210 and the reflector 220R. The second lens set 224B is located on the projection path of the image 212 and located between the reflector 220R and the user 10. In other words, in the present embodiment, according to the position information of the user 10 detected by the depth detecting module 240, the control unit 250 controls the relative positions between the first lens set 224A, the second lens set 224B, or the reflector 220R, or the control unit 250 adjusts the relative position of the projection lens set 220 relative to the image generator 210. Accordingly, the control unit 250 controls the position and the size of the floating real image 260. Further elaboration on the position adjustment methods and the relationship between the imaging position and the size are provided later in the disclosure.

Figure 4:
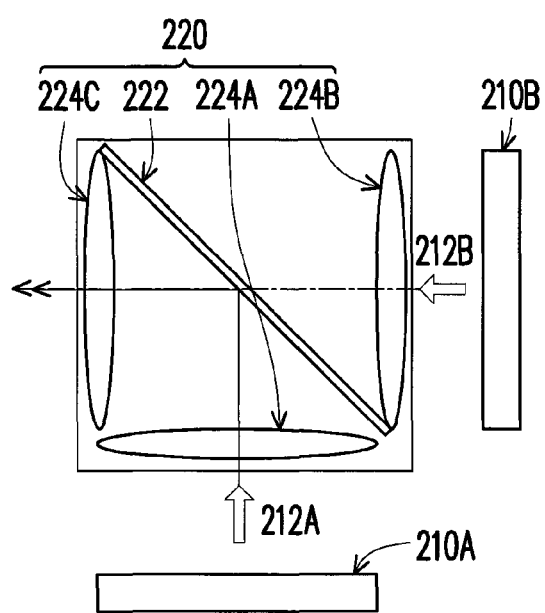
FIG. 4 is a schematic view illustrating a projection lens set in a display apparatus according to an embodiment of the disclosure.

FIG. 4 is a schematic view illustrating a projection lens set in a display apparatus according to an embodiment of the disclosure. In FIG. 4, the quantity of the image generator 210 is two, and the image generator 210 has a dual light path design. As shown in FIGS. 1 and 4, in the present embodiment, the image generator 210 includes the first image generator 210A and the second image generator 210B. The first image generator 210A displays the first image 212A, and the second image generator 210B displays the second image 212B. Moreover, the projection lens set 220 includes the beam combiner 222, the first lens set 224A, the second lens set 224B, and the third lens set 224C, in which the beam combiner 222 may be a half mirror, or a dichroic mirror selectively reflecting and transmitting different wavelengths of light. The beam combiner 222 is located on a projection path of the first image 212A and the second image 212B, and the beam combiner 222 reflects the first image 212A and transmits the second image 212B. The first lens set 224A is located on the projection path of the first image 212A and located between the first image generator 210A and the beam combiner 222. The second lens set 224B is located on the projection path of the second image 212B and located between the second image generator 210B and the beam combiner 222. The third lens set 224C is located on the projection path of the first image 212A and the second image 212B, and located between the beam combiner 222 and the user 10. In other words, referring to FIGS. 1 and 4, according to the position information of the user 10 detected by the depth detecting module 240, the control unit 250 adjusts the relative positions between the first lens set 224A, the second lens set 224B, the third lens set 224C, or the beam combiner 222, or the control unit 250 adjusts the relative position of the projection lens set 220 relative to each image generator 210. Accordingly, the control unit 250 controls the position and the size of the floating real image 260. Further elaboration on the position adjustment methods and the relationship between the imaging position and the size are provided later in the disclosure.

Figure 5:
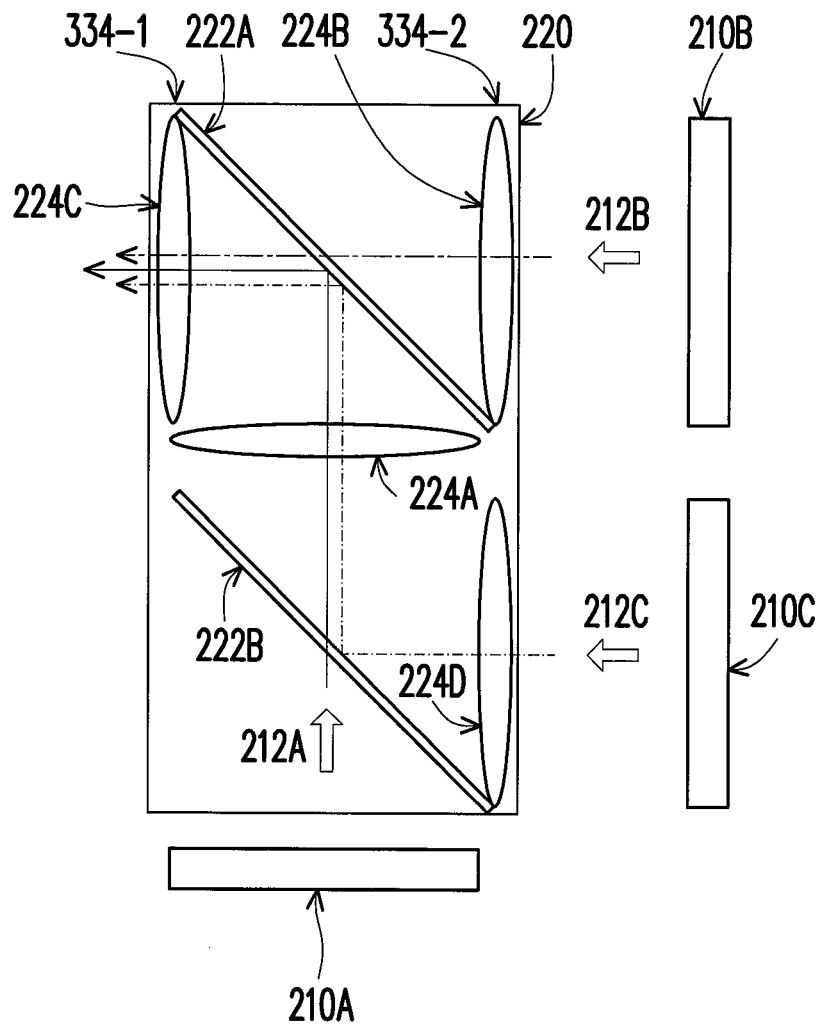
FIG. 5 is a schematic view illustrating a projection lens set in a display apparatus according to an embodiment of the disclosure.

FIG. 5 is a schematic view illustrating a projection lens set in a display apparatus according to an embodiment of the disclosure. In FIG. 5, the quantity of the image generator 210 is three, and the image generator 210 has a three light path design. As shown in FIG. 5, in the present embodiment, the image generator 210 includes the first image generator 210A, the second image generator 210B, and a third image generator 210C. The first image generator 210A displays the first image 212A, the second image generator 210B displays the second image 212B, and the third image generator 210C displays a third image 212C. Moreover, the projection lens set 220 includes a first beam combiner 222A, a second beam combiner 222B, the first lens set 224A, the second lens set 224B, the third lens set 224C, and a fourth lens set 224D. The first beam combiner 222A is located on a projection path of the first image 212A, the second image 212B, and the third image 212C. The first beam combiner 222A reflects the first image 212A and the third image 212C and transmits the second image 212B. The second beam combiner 222B is located on a projection path of the first image 212A and the third image 212C, and the second beam combiner 222B reflects the third image 212C and transmits the first image 212A. The first lens set 224A is located on the projection path of the first image 212A and the third image 212C, and located between the second beam combiner 222B and the first beam combiner 222A. The second lens set 224B is located on a projection path of the second image 212B and located between the second image generator 210B and the first beam combiner 222A. The third lens set 224C is located on the projection path of the first image 212A, the second image 212B, and the third image 212C, and located between the first beam combiner 222A and the user 10. The fourth lens set 224D is located on a projection path of the third image 212C, and located between the third image generator 210C and the second beam combiner 222B. In other words, referring to FIGS. 1 and 5, according to the position information of the user 10 detected by the depth detecting module 240, the control unit 250 controls the relative positions between the first lens set 224A, the second lens set 224B, the third lens set 224C, the fourth lens set 224D, the first beam combiner 222A, or the second beam combiner 222B, or the control unit 250 adjusts the relative position of the projection lens set 220 relative to each image generator. Accordingly, the control unit 250 controls the position and the size of the floating real image 260.

Figure 6A:
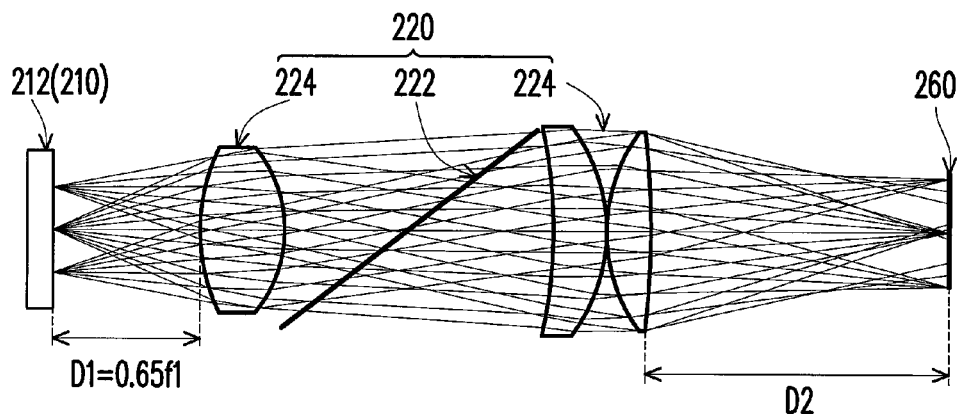
FIGS. 6A-6C are schematic views illustrating a light path of a floating real image generated after an image is projected by a projection lens set in a display apparatus according to an embodiment of the disclosure.
Figure 6B:
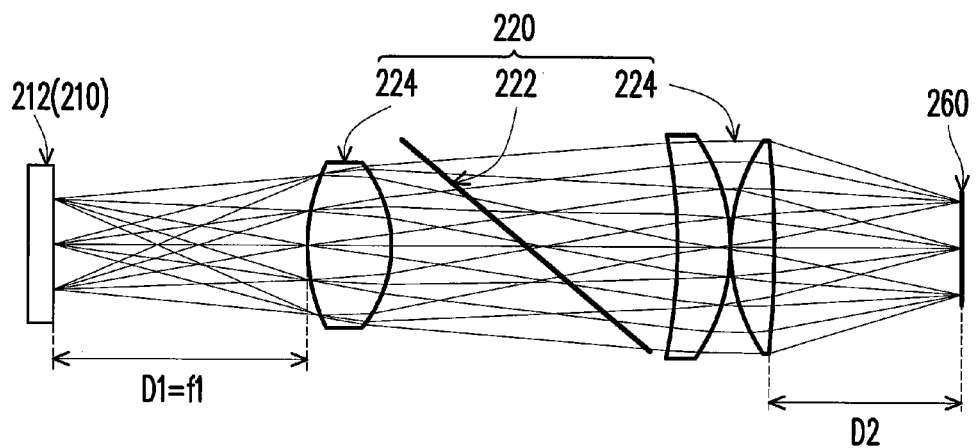
Figure 6C:
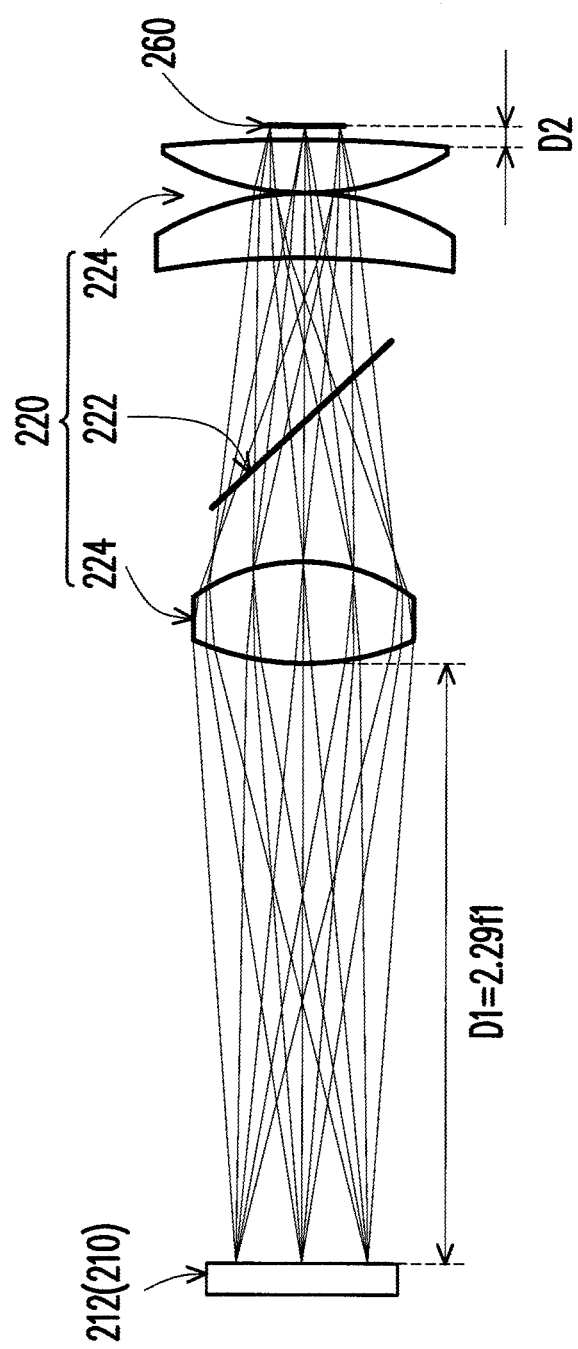

FIGS. 6A-6C are included to further elaborate on the relationships between the relative positions of the image generator and the projection lens set, and the position and the size of the floating real image.

FIGS. 6A-6C are schematic views illustrating a light path of a floating real image generated after an image is projected by a projection lens set in a display apparatus according to an embodiment of the disclosure. The display apparatus is, for example, a display apparatus having the projection lens set depicted in FIG. 5. In other words, the present embodiment adopts the three light path design, and the lens sets in the projection lens set 220 can allow two common channels of light paths. One of the light paths is described hereafter as an illustrative example. In the example, a focal distance of the lens set in the projection lens set 220 closer to the image generator 210 is f1, and a focal distance of the lens set in the projection lens set 220 closer to the floating real image 260 is f2, in which f1 and f2 are respectively 26.2 cm and 30.3 cm, for example. When the relative positions of each element in the projection lens set 220 are fixed, an imaging location and a magnifying power of the floating real image 260 can be controlled by adjusting an object distance D1 between the image generator 210 and the projection lens set 220.

To be specific, the object distance D1 between the image generator 210 to the projection lens set 220 in FIG. 6A is shorter than the object distance D1 in FIG. 6B. For example, the object distance D1 in FIG. 6A is shorter than the lens focal length f1, and the object distance D1 in FIG. 6B is equal to the lens focal length f1. Accordingly, an image distance D2 generated in FIG. 6A between the floating real image 260 and the projection lens set 220 is longer than the image distance D2 in FIG. 6B. Moreover, the magnifying power generated in FIG. 6A of the floating real image 260 relative to the image 212 is greater than the magnifying power generated in FIG. 6B of the floating real image 260 relative to the image 212. On the other hand, the object distance D1 between the image generator 210 to the projection lens set 220 in FIG. 6C is longer than the object distance D1 in FIG. 6B. Accordingly, the image distance D2 generated in FIG. 6C between the floating real image 260 and the projection lens set 220 is shorter than the image distance D2 in FIG. 6B. Moreover, the magnifying power generated in FIG. 6C of the floating real image 260 relative to the image 212 is less than the magnifying power generated in FIG. 6B of the floating real image 260 relative to the image 212.

For example, in FIG. 6B, the object distance D1 is 27.4 cm, the image distance D2 is 20 cm, and the magnifying power is 1. In other words, the size of the floating real image 260 in FIG. 6B is equal to the size of the image 212. In FIG. 6A, the object distance D1 is 17 cm, the image distance D2 is 34.2 cm, and the magnifying power is 1.36. That is to say, the size of the floating real image 260 in FIG. 6A is larger than the size of the image 212. In FIG. 6C, the object distance is 60 cm, the image distance D2 is 2.17 cm, and the magnifying power is 0.54. In other words, the size of the floating real image 260 in FIG. 6C is smaller than the size of the image 212. By adopting the imaging relationships described above in conjunction with a plurality of light path patterns (described later), the image 212 displayed by the image generator 210 can be respectively imaged at any position between the user 10 and the projection lens set 220. Moreover, the size of the floating real image 260 can be varied according to a requirement.

Tables 1 and 2 list the optical design parameters in a projection lens set of a display apparatus according to an embodiment of the disclosure. According to the embodiment described in Tables 1 and 2, the floating real image 260 can be imaged 20 cm in front of the projection lens set 220, and the user 10 can be located 50 cm in front of the floating real image 260. This design allows viewing at a large viewing angle, such that even if the user 10 moves left or right by 11 cm, the entire undistorted floating real image 260 can be viewed. In other words, the display apparatus 200 of the present embodiment can provide floating real images at a viewing angle of 34 degrees for the user 10.

TABLE 1

| Element | | Surface Information | | | Aperture | | |
|---------|---------|-----------|-------|------------|----------|----------|----------|
| | | Curvature | Shape | Thickness or | Size (X) | Shape (Y) | |
| Number | Surface | (mm) | (Y) | Spacing (mm) | (mm) | (mm) | Material |
| Display Panel | | INF | FLT | 272 | | | |
| Lens 1 | 1 | 312.411 | A-1 | 95 | 211.470 | CIR | PMMA |
| Lens 1 | 2 | −198.914 | A-2 | 140 | 234.232 | CIR | |
| | | | | | 239.679 | CIR | |
| Lens 2 | 1 | INF. | FLT | 3 | 402.122 | CIR | BK7 Schott |
| Lens 2 | 2 | INF. | FLT | 160 | 400.335 | CIR | |
| | | | | | 263.546 | | |
| Lens 3 | 1 | 577.436 | A-3 | 64.3273 | 287.813 | CIR | PMMA |
| Lens 3 | 2 | −302.590 | A-4 | 1 | 280 | CIR | |
| Lens 4 | 1 | 723.445 | A-5 | 47.072 | 280 | CIR | PMMA |
| Lens 4 | 2 | −1998.841 | A-6 | 202.6616 | 303.379 | CIR | |
| | | | | | 296.246 | | |
| Image | | INT | FLT | | 125.915 | | |

Table 2 are design parameters of the aspheric lenses in Table 1, in which the parameters of the aspheric constants are follow the formula below, and the corresponding parameters are listed in Table 2:

$$Z = \frac{(CURV)Y^2}{1 + \sqrt{1 - (1 + K)(CURV)^2 Y^2}} + (A)Y^4 + (B)Y^6 + (C)Y^8 + (D)Y^{10}$$

TABLE 2

| Aspheric | Curvature | K | A | B |
|----------|-----------|---|---|---|
| A-1 | 0.00320091 | 0.000000 | −2.27084E−08 | 0.00000E+00 |
| A-2 | −0.00502730 | 0.000000 | 1.97629E−08 | 0.00000E+00 |
| A-3 | 0.00173179 | 0.000000 | −5.80782E−08 | 0.00000E+00 |
| A-4 | −0.00330480 | 0.000000 | 4.60121E−10 | 0.00000E+00 |
| A-5 | 0.00138228 | 0.000000 | 4.53787E−08 | 0.00000E+00 |
| A-6 | −0.00050029 | 0.000000 | −3.34722E−09 | 0.00000E+00 |

Figure 7A:
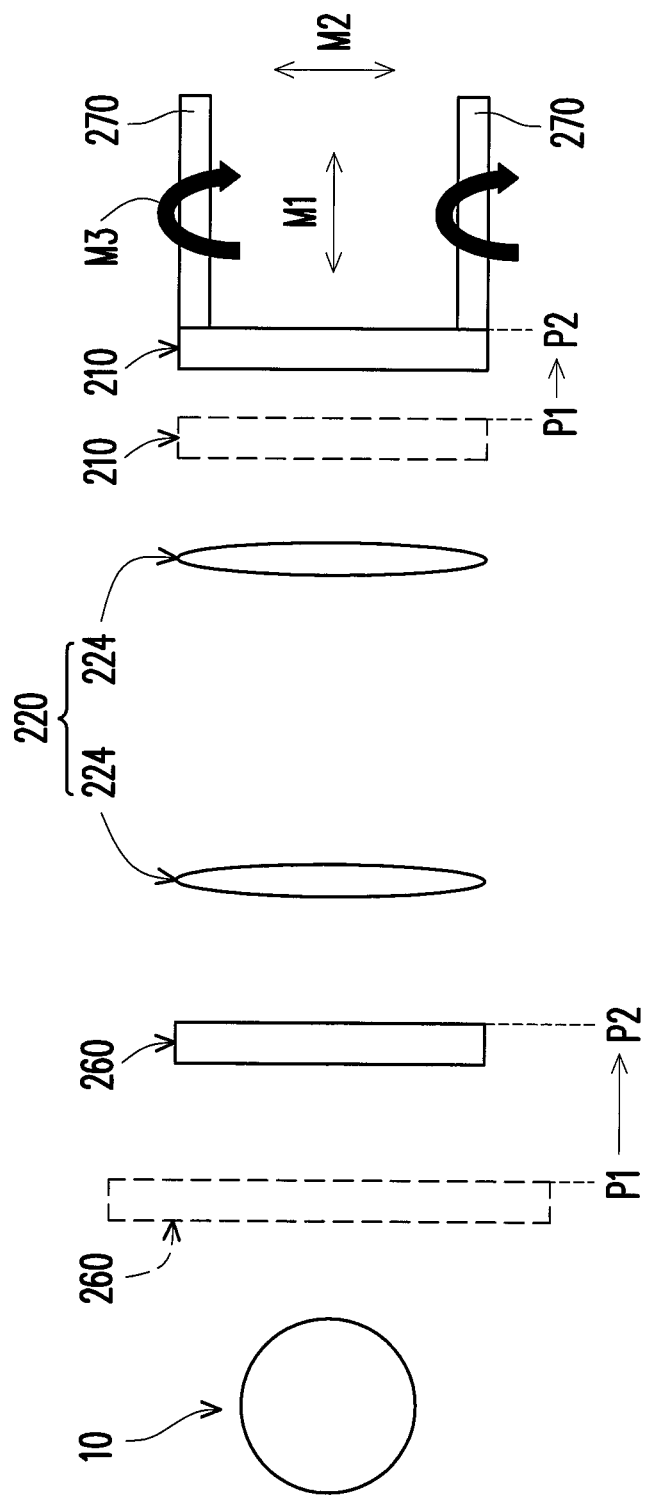
FIGS. 7A and 7B are schematic views illustrating an adjustment of the relative positions of the image generator and the projection lens set according to an embodiment of the disclosure.
Figure 7B:
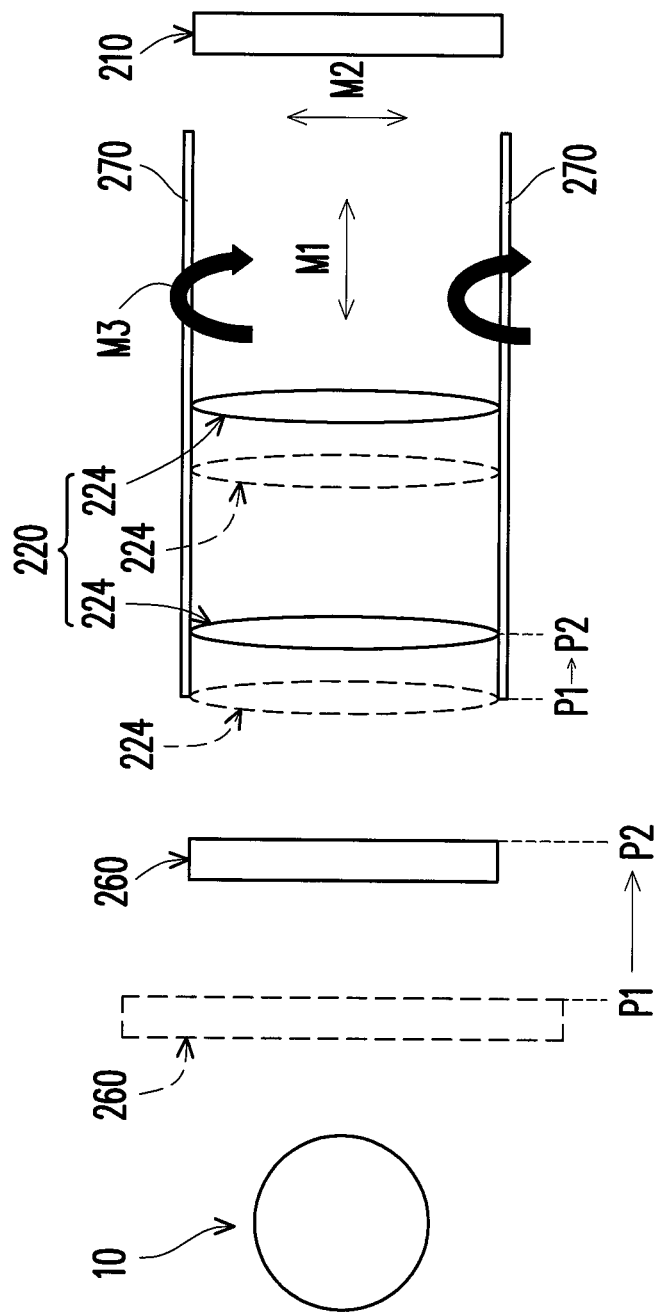

FIGS. 7A and 7B are included to elaborate on the adjustment of the relative positions of the image generator and the projection lens set.

FIGS. 7A and 7B are schematic views illustrating an adjustment of the relative positions of the image generator and the projection lens set according to an embodiment of the disclosure. These schematic relationship views describe how the final image location of the floating real image 260 can be varied by changing the object distance D1 between the image generator 210 to the projection lens set 220. Referring to FIG. 7A, in some applications, an actuator 270 can be used to move the image generator 210, such that the image generator 210 shifts along an axis relative to the projection lens set 220 to adjust the distance between the image generator 210 and the projection lens set 220, and thereby changing the image ratio or the image location of the floating real image 260. The single axial movement may be, for example, along a movement direction M1, a movement direction M2, or a rotation direction M3, although the disclosure is not limited thereto. As shown in FIG. 7A, when the position of the image generator 210 moves from a position P1 to a position P2, the corresponding image location of the floating real image 260 is also shifted from the position P1 to the position P2. Meanwhile, the size of the formed image decreases, and the floating real image shrinks.

It should appreciated that, the actuator 270 may also be used to move the projection lens set 220 to achieve the effects of altering the size and position of the floating real image 260. As shown in FIG. 7B, the movement of the projection lens set 220 may be along the movement direction M1, the movement direction M2, or the rotation direction M3. As shown in FIG. 7B, when the position of the projection lens set 220 moves from the position P1 to the position P2, the corresponding image location of the floating real image 260 is also shifted from the position P1 to the position P2. Meanwhile, the magnifying power of the formed image is less than 1, and the floating real image shrinks. For ease of description, a single light path is used in the embodiments illustrated in FIGS. 7A and 7B. The same principles apply when a display apparatus has a plurality of light paths therein, and therefore further elaboration thereof is omitted.

Figure 7C:
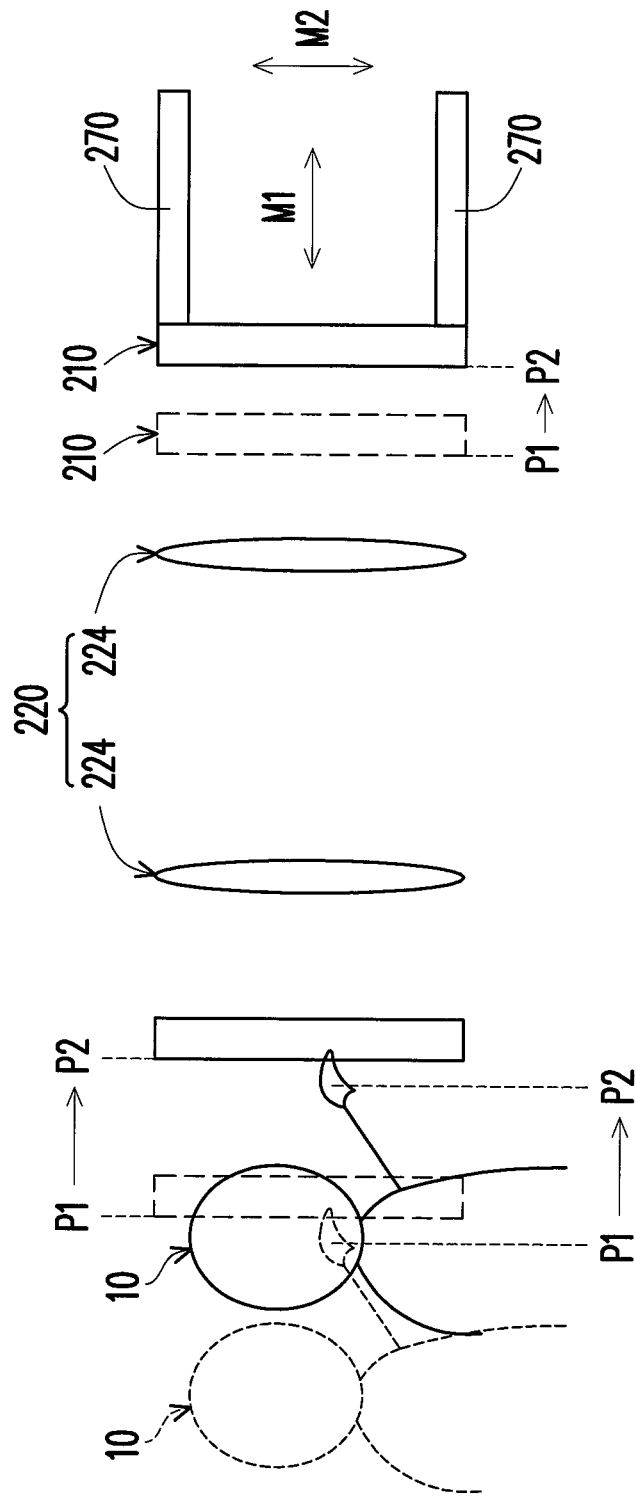
FIG. 7C is a schematic view illustrating an adjustment of a floating real image location according to a user position in a display apparatus according to an embodiment of the disclosure.

FIG. 7C is a schematic view illustrating an adjustment of a floating real image location according to a user position in a display apparatus according to an embodiment of the disclosure. As shown in FIG. 7C, when a depth of the fingers of the user 10 touching the floating real image 260 changes from position P1 to position P2, the depth detecting module 240 detects the position variation of the fingers of the user 10, and feeds a movement message back to the control unit 250 (depicted in FIGS. 1 and 11). The control unit 250 transmits the movement message to the image generator 210, so the image generator 210 corresponding moves from position P1 to position P2. Accordingly, the image location of the corresponding floating real image 260 can be moved from the original position P1 to the position P2. Moreover, the depth detecting module 240 may also be used to detect a state of the position of the user 10, such as detecting a type of body language variation of the user 10, or detecting a change in an object (e.g. a stylus) used by the user 10, although the disclosure is not limited thereto.

Using the display apparatuses shown in FIGS. 2 and 4 as examples, the embodiments of each display apparatus for rendering stereoscopic images are described.

Figure 8A:
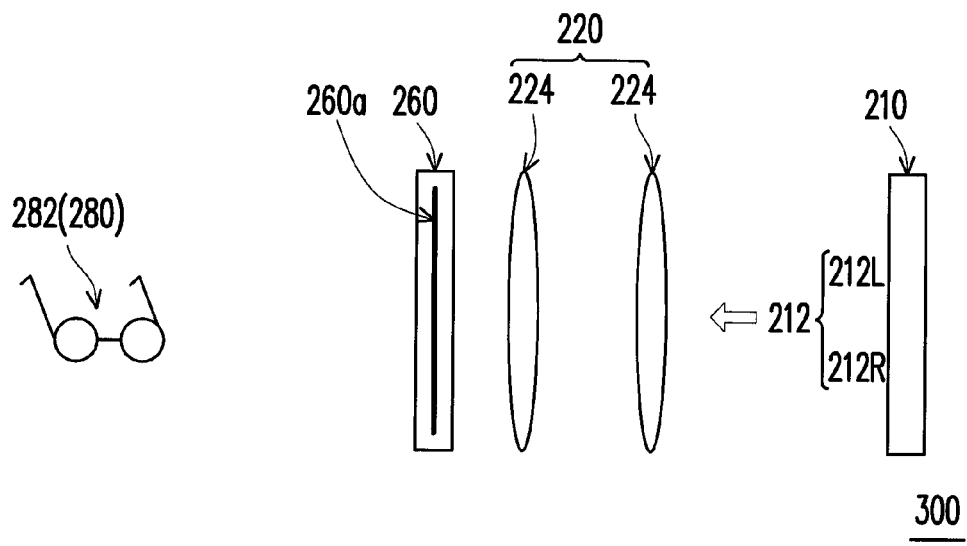
FIGS. 8A and 8B are respective schematic views illustrating a user wearing a pair of stereoscopic glasses to view the display apparatus having the projection lens set depicted in FIG. 2.
Figure 8B:
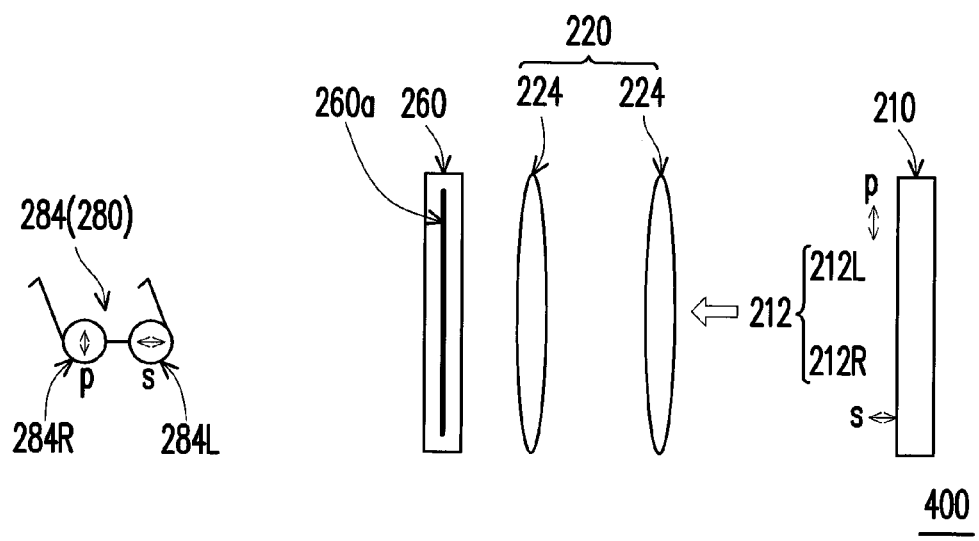

FIGS. 8A and 8B are respective schematic views illustrating a user wearing a pair of stereoscopic glasses to view the display apparatus having the projection lens set depicted in FIG. 2. As shown in FIG. 8A, in a display apparatus 300 of the present embodiment, the image generator 210 is a display panel, for example. Moreover, a pair of stereoscopic glasses 280 is, for example, a pair of shutter glasses 282 having a scanning frequency. It should be noted that, when a switching rate of the shutter glasses 282 is synchronized with the scanning frequency of the image generator 210, the user 10 can view the virtual stereoscopic floating real image 260 displayed by a single display panel through the shutter glasses 282. For example, a display frequency of the display panel is 120 Hz and the frequency of the switching rate of the shutter glasses 282 is 60 Hz. In other words, the display panel alternately displays $1/120$ seconds of a left eye image 212L and $1/120$ seconds of a right eye image 212R. Moreover, the left and right lenses of the shutter glasses 282 respectively switch on and off correspondingly at $1/60$ seconds, and accordingly the user 10 can view the stereoscopic floating real image 260 through the shutter glasses 282. Furthermore, the floating real image 260 with stereoscopic imaging formed accordingly may also be constituted by a plurality of sub-floating real images 260a located on the same plane, or by sub-floating real images 260a located on different same planes, and the disclosure is not limited thereto. In other words, the display apparatus 300 depicted in FIG. 8A renders the stereoscopic imaging effect for the floating real image 260 by timing switching, and thus the resolution of the image can be maintained.

Another embodiment is shown in FIG. 8B. In a display apparatus 400 of the present embodiment, the scanning frequency of the image generator 210 may be 60 Hz, and the stereoscopic glasses 280 is, for example, a pair of polarized glasses 284 having two polarized lenses 284R and 284L of different polarizing directions. For example, a right eye polarized lens 284R has a perpendicular polarizing direction p, and a left eye polarized lens 284L has a horizontal polarizing direction s. The image 212 displayed by the display panel includes a right eye image 212R with the perpendicular polarizing direction p and a left eye image 212L with the horizontal polarizing direction s. Therefore, when the user 10 wears the polarized glasses 284, the user 10 can view the virtual stereoscopic floating real image 260 displayed by a single display panel. Likewise, the floating real image 260 with stereoscopic imaging formed accordingly may also be constituted by a plurality of sub-floating real images 260a located on the same plane, or by sub-floating real images 260a located on different same planes, and the disclosure is not limited thereto. In other words, since the display apparatus 400 depicted in FIG. 8B renders the stereoscopic imaging effect for the floating real image 260 by spatial combination, therefore, the display frequency of the display panel does not need to be accelerated, thereby simplifying circuit control.

Figure 9A:
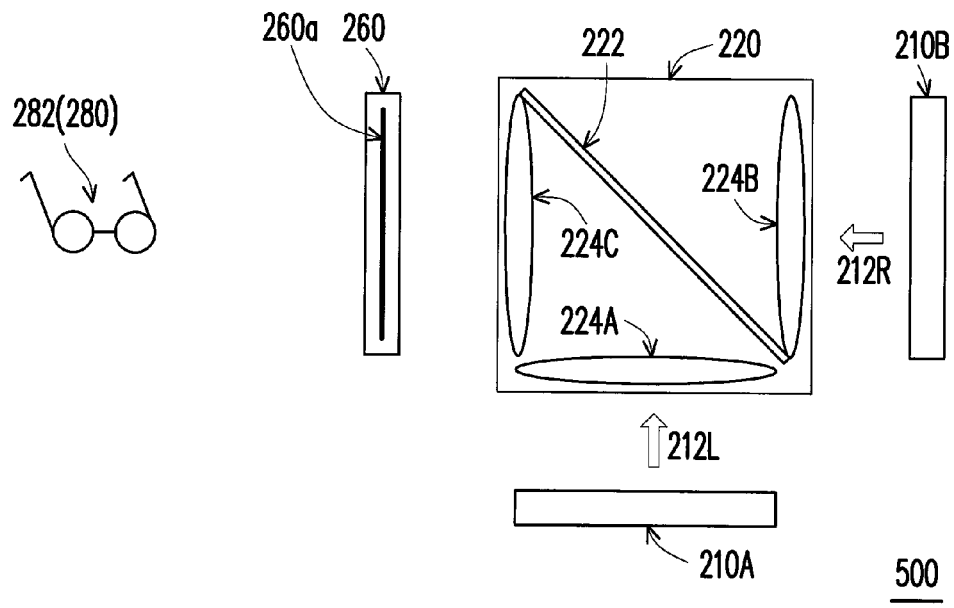
FIGS. 9A and 9B are respective schematic views illustrating a user wearing a pair of stereoscopic glasses to view the display apparatus having the projection lens set depicted in FIG. 4.
Figure 9B:
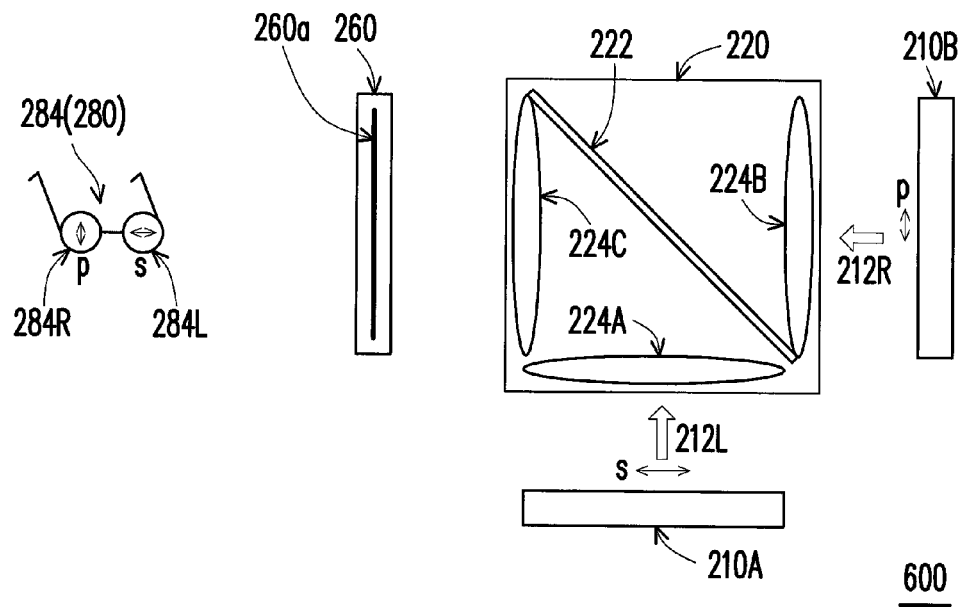

FIGS. 9A and 9B are respective schematic views illustrating a user wearing a pair of stereoscopic glasses to view the display apparatus having the projection lens set depicted in FIG. 4. Referring to FIG. 9A, in a display apparatus 500 of the present embodiment, the image generator 210 are two display panels, for example. Moreover, the stereoscopic glasses 280 is, for example, a pair of shutter glasses 282 having a scanning frequency. In particular, when a switching rate of the shutter glasses 282 is synchronized with the scanning frequency of the image generator 210, the user 10 can view the virtual stereoscopic floating real image 260 displayed by the first image generator 210A and the second image generator 210B through the shutter glasses 282. For example, the display frequency of the first image generator 210A and the second image generator 210B are 60 Hz, for example, and the frequency of the switching rate of the shutter glasses 282 is 60 Hz. In other words, the first image generator 210A may display a left eye image 212L every $1/60$ seconds, and the second image generator 210B may display a right eye image 212R every $1/60$ seconds. Moreover, the left and right lenses of the shutter glasses 282 respectively switch on and off correspondingly at $1/60$ seconds. Likewise, the floating real image 260 with stereoscopic imaging formed accordingly may also be constituted by a plurality of sub-floating real images 260a located on the same plane, or by sub-floating real images 260a located on different same planes depending on the display effect, and the disclosure is not limited thereto. Since the display apparatus 500 depicted in FIG. 9A renders the stereoscopic imaging effect for the floating real image 260 by using two image generators 210, therefore, not only is the resolution of the image 212 maintained, but the display frequency of the display panel also does not need to be accelerated, thereby simplifying circuit control.

Moreover, as shown in FIG. 9B, in a display apparatus 600 of the present embodiment, the image generator 210 having two display panels is similar to FIG. 9A, for example. The stereoscopic glasses 280 of the present embodiment is similar to the polarized glasses 284 depicted in FIG. 8B. The right eye polarized lens 284R has the perpendicular polarizing direction p, and the left eye polarized lens 284L has the horizontal polarizing direction s, for example. The first image generator 210A of the present embodiment displays the left eye image 212L having the horizontal polarizing direction s, for example, and the second image generator 210B displays the right eye image 212R having the perpendicular polarizing direction p. Therefore, when the user 10 wears the polarized glasses 284, the user 10 can view the virtual stereoscopic floating real image 260 displayed by two display panels. Likewise, the floating real image 260 with stereoscopic imaging formed accordingly may also be constituted by a plurality of sub-floating real images 260a located on the same plane, or by sub-floating real images 260a located on different same planes, and the disclosure is not limited thereto. In other words, since the display apparatus 600 depicted in FIG. 9B renders the stereoscopic imaging effect for the floating real image 260 by using two image generators 210, therefore, not only is the resolution of the image maintained, but the display frequency of the display panel also does not need to be accelerated, thereby simplifying circuit control.

It should be noted that, in practical applications, the display apparatus in the disclosure can rapidly move the image generator or the projection lens set. Moreover, in conjunction with synchronized display by the image generator, the visual retention characteristic of human vision can be exploited to achieve a viewing effect of multiple layers of stacking images, and the stereoscopic floating real image generated includes a floating real image by binocular parallax, a floating real image by motion parallax, or a combination of the two. It should be appreciated that, in practical applications, since the image locations are not the same, the image size also shrinks or expands due to the object-image relationship. On the other hand, when the floating real image becomes distorted because of the restriction from the projection lens set, front-end image processing can be performed in conjunction with the display portion to achieve the most preferable display effect. Moreover, when the display apparatus is an auto-stereoscopic display apparatus, the related design parameters of the image generator (display panel) can be corrected by altering the object distance to adjust the location and the size of the floating real image, such that the user can view the most preferable stereoscopic effect. Specifically, by adjusting the optical elements in the projection lens set of the display apparatus, such as by changing a parallax barrier into a liquid crystal parallax barrier, altering the period of the parallax barrier, or by using the parallax barrier to adjust the distance from the barrier to the display pixels so as to achieve the needed stereoscopic effect, the loss of the stereoscopic effect of the floating real image from the changing positions of the image generator can be prevented. Reference regarding these techniques may be directed to the co-pending U.S. Patent Application No. 61528766, Method for Autostereoscopic Display.

Figure 10A:
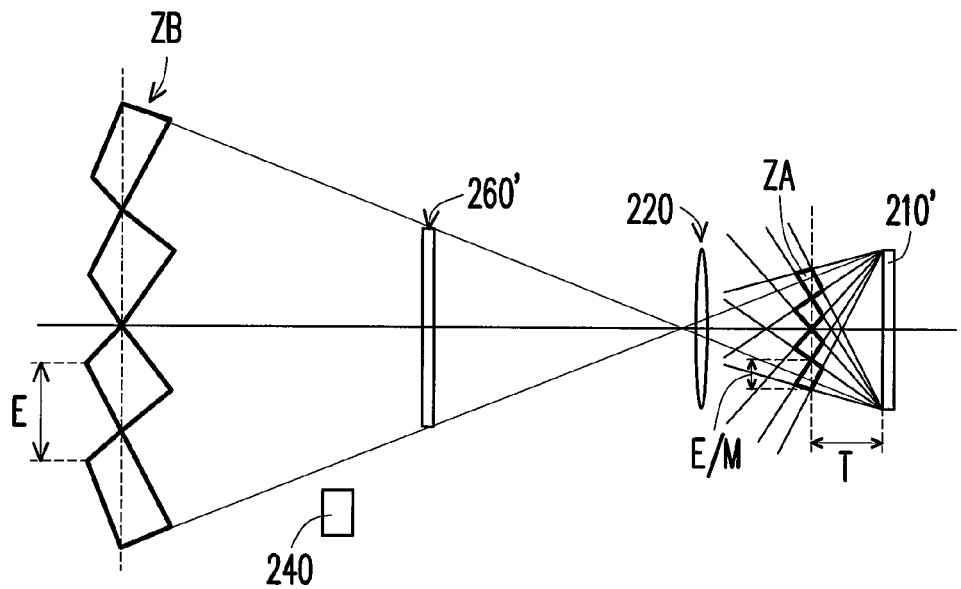
FIGS. 10A and 10B are schematic views illustrating a display apparatus using auto-stereoscopic 3D display panels to replace conventional 2D planar display panels according to an embodiment of the disclosure.
Figure 10B:
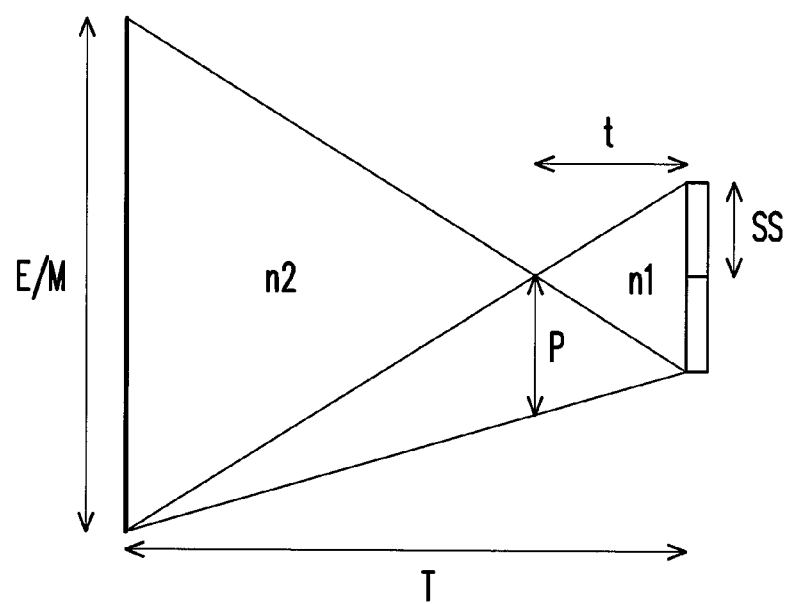

To be specific, FIGS. 10A and 10B are schematic views illustrating a display apparatus using auto-stereoscopic 3D display panels to replace conventional 2D planar display panels according to an embodiment of the disclosure. Referring to FIG. 10A, an auto-stereoscopic 3D display panel 210' forms a stereoscopic 3D floating real image 260' at an image side through the projection lens set 220. Meanwhile, an original viewing zone ZA having an optimal viewing position of the auto-stereoscopic 3D display panel 210' forms, at an image side, a viewing zone ZB having an optimal viewing position of the stereoscopic 3D floating real image 260' formed through the projection lens set 220 and is floating in air. As shown in FIG. 10A, the display apparatus has two object-image relationships, respectively the object-image relationship of the auto-stereoscopic 3D display panel 210' and the stereoscopic 3D floating real image 260', and the object-image relationship of the viewing zone ZA having the optimal viewing position of the auto-stereoscopic 3D display panel 210' and the viewing zone ZB having the optimal viewing position of the stereoscopic 3D floating real image 260'. These two object-image relationships are related to the image locations and magnifying powers thereof and should be considered concurrently. Referring to FIGS. 10A and 10B, the depth detecting module 240 can detect the position of the user 10 or the position and the size the stereoscopic 3D floating real image 260', and accordingly feeds the information back to the auto-stereoscopic 3D display panel 210' and the projection lens set 220. Since the magnifying power of the projection lens set 220 is M, the size of the image projected by the auto-stereoscopic 3D display panel 210' in the viewing zone ZA is E/M, in which E is image size locate in the viewing zone ZB. Moreover, the size of subpixels (SS) of the image provided by the auto-stereoscopic 3D display panel 210', the distance T between the auto-stereoscopic 3D display panel 210' to the view ZA, and the size E/M of the image provided by the auto-stereoscopic 3D display panel 210' satisfy a following formula:

$$(N \times SS)/\left(\frac{E}{M}/\Delta N\right) = \frac{t}{n1}/\frac{T}{n2}$$

$$N \times SS/P = \left(\frac{T}{n2} + \frac{t}{n1}\right)/\frac{T}{n2},$$

in which n1 and n2 are respective refractive indices between the parallax barrier and the display panel and between the parallax barrier and the viewer, n1 is 1.523 for glass, and n2 is 1 for air, for example. Moreover, P is a period of the parallax barrier, t is the distance between the parallax barrier and the display panel, N is a number of viewing zones of the stereoscopic display panels, and ΔN is a viewing zone difference seen by the viewer. For example, if the left and right eyes respectively sees viewing zones 1 and 3, then ΔN is 2. Therefore, according to the position of the user 10 or the position and size of the stereoscopic 3D floating real image 260' detected by the depth detecting module, the display apparatus in the disclosure can correspondingly adjust the magnifying power and the image location of the projection lens set.

Figure 11:
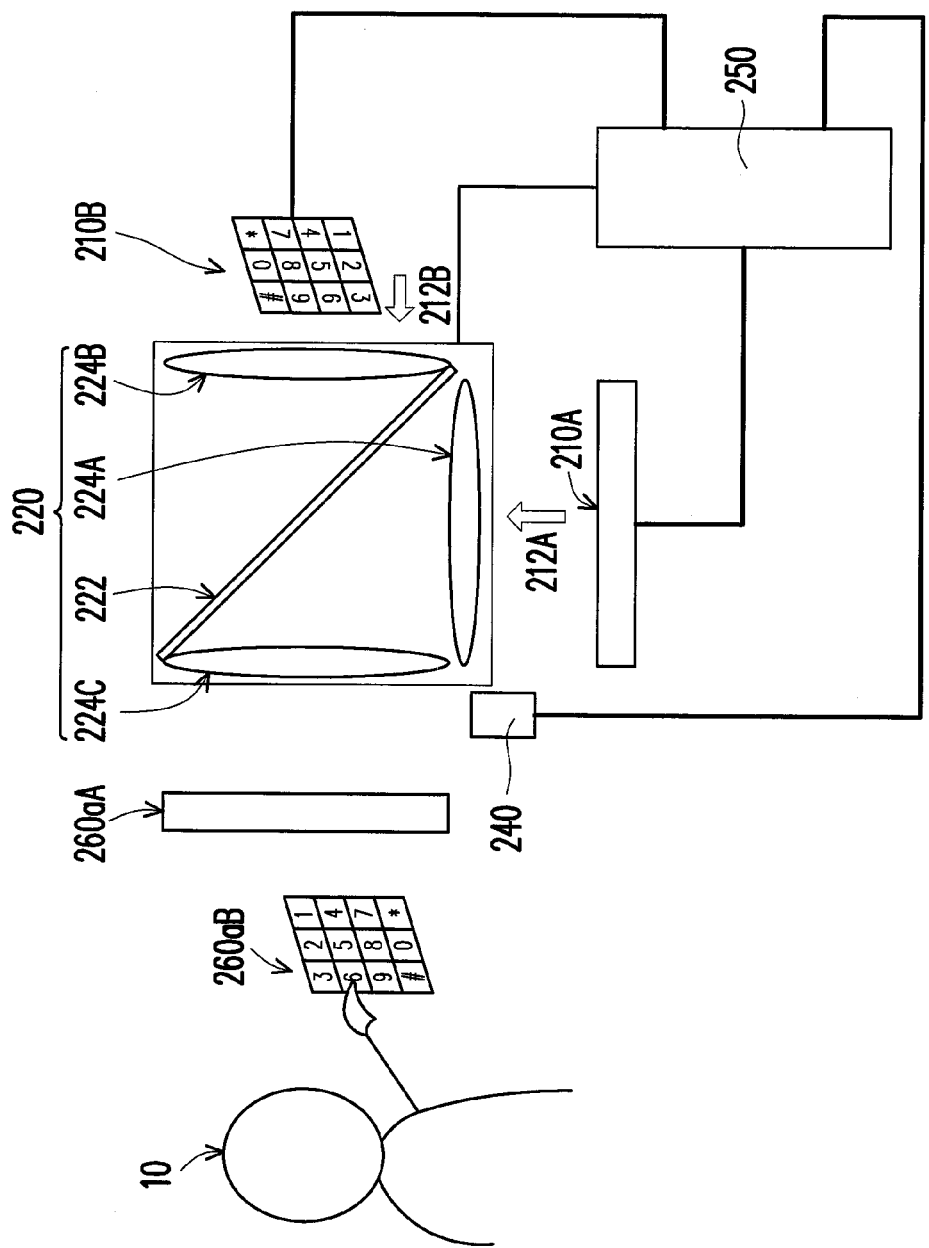
FIG. 11 is a schematic view illustrating a framework of a display apparatus according to an embodiment of the disclosure.

FIG. 11 is a schematic view illustrating a framework of a display apparatus according to an embodiment of the disclosure. Referring to FIG. 11, in the present embodiment, a device generating the first image 212A is a display panel, for example, and a device generating the second image 212B is a physical keypad. By using the afore-described projection lens set 220, the keypad may be projected in front of the user 10 so as to generate a floating real image 260 of a 3D keypad with depth perception. When the user 10 is at a suitable viewing position, the floating real image 260 is, for example, floating 20 cm in front of the projection lens set 220, and the user 10 can view the floating real image 260 at a position that is 70 cm in front of the projection lens set 220. Accordingly, the distance from the user 10 to the floating real image 260 is 50 cm, which is a comfortable distance for the arms of most people to touch an object. In one usage scenario, when the user 10 touches any key, the depth detecting module 240 may detect a key location touched by the fingers of the user 10, and feeds a touch message back to the control unit 250. A corresponding message (e.g., a preset image or voice feedback message) is sent to the user 10, and accordingly an interactive effect is achieved.

Moreover, the display apparatus in the disclosure may utilize the afore-described active depth detecting module 240 in order to have the display apparatus respond to the user. In other words, the display apparatus in the disclosure not only has the image variation depicted in FIGS. 10A and 10B, but furthermore, the active depth detecting module 240 can be used to feedback control the entire system of the display apparatus, thereby achieving the interactive function. Further elaboration of the depth detecting module 240 is provided below.

In another embodiment of the disclosure, an active depth detecting module 240 is included. In conjunction with the afore-described optical design, the user can be provided with free-space real images for human-machine interaction, so that the user can touch the images floating in natural space. Moreover, by the feedback of the detected finger depth variation, the corresponding image content can be generated to achieve the interactive effect.

Reference for an active depth detecting module that may be applied in the disclosure can be directed towards the co-pending U.S. Patent Application No. 61475648, Apparatus and Method for Depth Image Capturing. By projecting specific patterns on the detection object using an active light source, an image depth information of the detection object can be calculated by a real and virtual image comparison technique. The active light source is formed by a light source and a designed diffractive optical lens set, capable of generating irregularly distributed bright spot images, controlling the size of the incident beam, and adjusting a distribution density of the bright spot images. The principles for calculating the depth images is based on image comparison techniques. Besides simultaneously obtaining projection pattern images from two sets of synchronized video cameras, an embodiment of the disclosure further uses the projection device as a virtual video camera, so as to respectively calculate the corresponding spatial relationship of each video camera and the projection device. Thereafter, the disparity images are utilized for mutual verification, thereby enhancing an accuracy thereof and compensating for an image shielding issue.

Referring to FIG. 11, an embodiment of the disclosure projections an image having a specific content in free space by using a combination of the afore-described optical framework and image display techniques. The image displayed includes 2D and 3D images as described earlier. For example, a 3D keypad with depth perception may be displayed in space. When the user 10 is at a suitable viewing position, the afore-described optical design floats the image 20 cm in front of the projection lens set 220, and the viewer can view the image by standing 70 cm in front of the projection lens set 220. Accordingly, the distance from the user 10 to the image is 50 cm, which is a comfortable distance for the arms of most people to touch an object. When the user 10 touches a key (the second sub-floating real image), the active depth detecting module 240 can detect where the fingers lightly pressed the key. Since the user 10 has only touched the key but has not actually done a press down action, a simulated key press effect cannot be achieved. Therefore, the active depth detecting module may detect the slight finger depth variation and feedback to the control unit 250, so as to receive a corresponding response message including an image or voice feedback message. The entire framework may be as shown in FIG. 11.

The active depth detecting module in the disclosure may be used in any afore-described arbitrary optical frameworks as well as on the image side. In conjunction with the generation of the display image and the feedback message, the display apparatus may be applied in many public places, such as in automatic teller machines (ATMs), public phones, or navigation systems. Furthermore, in order for the simulated effects to appear more realistic, a force feedback device may be added to enhance a sense of reality for touching the floating real images.

Besides referring to the co-pending U.S. Patent Application No. 61475648, Apparatus and Method for Depth Image Capturing for the active depth detecting module projecting specific patterns on the detection object, a light source of a specific wavelength may also be projected. The depth is detected by the reflected signals, and an infrared light source is typically used to prevent interference from the external visible light. In addition to the active depth detecting module, a passive depth detecting module may also be adopted, such as dual video cameras for image capture that obtains depth information by an image comparison technique.

Besides detecting the finger depth variation, the depth detecting module in the disclosure may also be used to detect various types of body language changes to the user, or a change in an object, such as a stylus or the like.

Moreover, the display apparatus may further include an interactive module formed by a depth detecting module and a force feedback system, in which the force feedback system and the depth detecting module are connected. The depth detecting module may be an active depth detecting module or a passive depth detecting module. To be specific, in one embodiment, the active depth detecting module may use one or more light sensing elements to calculate an image depth information of a detection object by a real and virtual image comparison technique, in which specific patterns are projected on the detection object using an active light source. In another embodiment, a light sensing element is used to calculate the image depth information of the detection object by a triangulation distance measuring technique, in which a laser may be actively emitted on the detection object. Alternatively, by using an ultrasonic receiver, the active depth detecting module may also calculate the image depth information of the detection object by a round-trip time of an ultrasound wave actively emitted on the detection object. Moreover, the depth detecting module is suitable for detecting spatial positions of the limbs of the user or an operating object, so as to perform interactive control with floating real images of different depth positions. The force feedback system feeds a tactile sensation of touching the floating real image back to the user, and accordingly the user and the floating real images can interact with each other.

In view of the foregoing, by the emitted beam from the projection lens set satisfying a specific relationship, the display apparatus in the disclosure can generate a floating real image between the projection lens set and the user. Moreover, by using the depth detecting module to detect the user position, and the control unit electrically connected to the image generator, the projection lens set, and the depth detecting module, the image generator and the projection lens set can adjust the position of the floating real image according to the user position. In some embodiments, the floating real image is an auto-stereoscopic image, or a stereoscopic floating real image viewable by a pair of stereoscopic glasses. Accordingly, the display apparatus in the disclosure can provide the user a realistic interactive experience that is true to life.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display apparatus suitable for viewing by a user, the display apparatus comprising:
    at least an image generator displaying at least an image;
    a projection lens set located between the image generator and the user, the image projected by the projection lens set and generating a floating real image between the projection lens set and the user, wherein each beam forming the floating real image has a light-cone angle θ, each beam has a chief ray and a plurality of marginal rays, each marginal ray and the corresponding chief ray has an included angle α, and the light-cone angle θ=2α;
    a depth detecting module detecting the position of the user, the image generator and the projection lens set adjusting the position of the floating real image according to the position of the user, wherein the size of the floating real image is L, the distance between two eyes of the user is W, the distance between the user and the floating real image is D, and the light-cone angle θ satisfies a formula:

$$\theta \geq \tan^{-1}\left(\frac{L+W}{D}\right);$$

and
    a control unit electrically connected to the image generator, the projection lens set, and the depth detecting module.

2. The display apparatus as claimed in claim 1, wherein the control unit controls a movement of the image generator according to the position of the user detected by the depth detecting module, so as to adjust a relative positions of the image generator and the projection lens set, the position of the floating real image, and the size of the floating real image.

3. The display apparatus as claimed in claim 1, wherein the display apparatus comprises one image generator, and the projection lens set comprises two lens sets disposed on a projection path of the image.

4. The display apparatus as claimed in claim 1, wherein the display apparatus comprises one image generator, and the projection lens set comprises:
    a reflector located on a projection path of the image;
    a first lens set located on the projection path of the image and formed by at least a lens, and a total focal length of the first lens set is a positive value; and
    a second lens set located on the projection path of the image and between the reflector and the user, the second lens set formed by at least a lens, and a total focal length of the second lens set is a positive value.

5. The display apparatus as claimed in claim 1, wherein image generator comprises a first image generator and a second image generator, the first image generator displaying a first image, and the second image generator displaying a second image, the projection lens set comprising:
    a beam combiner located on a projection path of the first image and the second image, and the beam combiner reflects the first image and transmits the second image;
    a first lens set located on a projection path of the first image and between the first image generator and the beam combiner, the first lens set formed by at least a lens;
    a second lens set located on a projection path of the second image and between the second image generator and the beam combiner, the second lens set formed by at least a lens; and
    a third lens set located on the projection path of the first image and the second image and between the beam combiner and the user, the third lens set formed by at least a lens.

6. The display apparatus as claimed in claim 1, wherein the image generator comprises a first image generator, a second image generator, and a third image generator, the first image generator displaying a first image, the second image generator displaying a second image, and the third image generator displaying a third image, the projection lens set comprising:
    a first beam combiner located on a projection path of the first image, second image, and the third image, the first beam combiner reflecting the first image and the third image and transmitting the second image;
    a second beam combiner located on a projection path of the first image and the third image, the second beam combiner reflecting the third image and transmitting the first image;
    a first lens set located on the projection path of the first image and the third image and between the second beam combiner and the first beam combiner, the first lens set formed by at least a lens;
    a second lens set located on a projection path of the second image and between the second image generator and the first beam combiner, the second lens set formed by at least a lens;
    a third lens set located on the projection path of the first image, the second image, and the third image, and located between the first beam combiner and the user, the third lens set formed by at least a lens; and
    a fourth lens set located on a projection path of the third image and between the third image generator and the second beam combiner, the fourth lens set formed by at least a lens.

7. The display apparatus as claimed in claim 1, wherein the display apparatus comprises more than one image generators, and the floating real image comprises a plurality of sub-floating real images located on different planes.

8. The display apparatus as claimed in claim 1, wherein the display apparatus comprises more than one image generators, and the floating real image comprises a plurality of sub-floating real images located on a same plane.

9. The display apparatus as claimed in claim 1, wherein the display apparatus comprises at least one image generator, and the floating real image comprises at least a stereoscopic floating real image, wherein the stereoscopic floating real image comprises a floating real image of binocular parallax, a floating real image of motion parallax, or a combination of the two.

10. The display apparatus as claimed in claim 1, wherein the size of the floating real image is greater than or less than the size of the image.

11. The display apparatus as claimed in claim 1, wherein the size of the floating real image is equal to the size of the image.

12. The display apparatus as claimed in claim 1, further comprising a pair of stereoscopic glasses, wherein the floating real image viewed by the user through the stereoscopic glasses is a stereoscopic image.

13. The display apparatus as claimed in claim 12, wherein the pair of stereoscopic glasses is a pair of shutter glasses, the image generator having a scanning frequency, and a switching frequency of the pair of shutter glasses is synchronized with the scanning frequency of the image generator.

14. The display apparatus as claimed in claim 12, wherein the pair of stereoscopic glasses is a pair of polarized glasses, the polarized glasses having two polarized lenses with different polarizing directions.

15. The display apparatus as claimed in claim 1, wherein the image generator comprises a display panel, a light emitting device, or an object being illuminated by light.

16. The display apparatus as claimed in claim 1, wherein the display apparatus further comprises an interactive module, comprising:
   the depth detecting module; and
   a force feedback system connected to the depth detecting module.

17. The display apparatus as claimed in claim 16, wherein the depth detecting module is an active depth detecting module.

18. The display apparatus as claimed in claim 17, wherein the active depth detecting module uses one or more light sensing elements to calculate an image depth information of a detection object by a real and virtual image comparison technique, wherein a plurality of specific patterns are projected on the detection object by using an active light source.

19. The display apparatus as claimed in claim 17, wherein the active depth detecting module uses a light sensing element to calculate an image depth information of a detection object by a triangulation distance measuring technique, wherein a laser is actively emitted on the detection object.

20. The display apparatus as claimed in claim 17, wherein the active depth detecting module uses an ultrasonic receiver to calculate an image depth information of a detection object by a round-trip time of an ultrasound wave actively emitted on the detection object.

21. The display apparatus as claimed in claim 17, wherein the depth detecting module is suitable for detecting a spatial position of the limbs of the user or an operating object, so as to perform interactive control with floating real images of different depth positions.

22. The display apparatus as claimed in claim 17, wherein the force feedback system feeds a tactile sensation of touching the floating real image back to the user.

23. The display apparatus as claimed in claim 16, wherein the depth detecting module is a passive depth detecting module.

* * * * *